(12) United States Patent
Rajan et al.

(10) Patent No.: US 7,257,081 B2
(45) Date of Patent: Aug. 14, 2007

(54) METHOD AND SYSTEM FOR TRAFFIC MONITORING IN A PACKET COMMUNICATION NETWORK

(75) Inventors: Rajendran Rajan, Philadelphia, PA (US); Roch Guerin, Newtown Square, PA (US)

(73) Assignee: Iptivia, Inc., New York, NY (US)

( * ) Notice: Subject to any disclaimer, the term of this patent is extended or adjusted under 35 U.S.C. 154(b) by 1049 days.

(21) Appl. No.: 10/126,310

(22) Filed: Apr. 19, 2002

(65) Prior Publication Data

US 2003/0198190 A1 Oct. 23, 2003

(51) Int. Cl.
*H04L 12/26* (2006.01)

(52) U.S. Cl. ...................................... 370/231; 370/235
(58) Field of Classification Search ........ 370/252–253, 370/229–235, 238, 351–356, 389–391, 400–411
See application file for complete search history.

(56) References Cited

U.S. PATENT DOCUMENTS

| | | | |
|---|---|---|---|
| 4,939,726 A | 7/1990 | Flammer | |
| 5,101,348 A | 3/1992 | Arrowood et al. | |
| 5,115,433 A | 5/1992 | Baran | |
| 5,309,433 A | 5/1994 | Cidon | |
| 5,317,566 A | 5/1994 | Joshi | |
| 5,323,394 A | 6/1994 | Perlman | |
| 5,365,523 A | 11/1994 | Derby et al. | |
| 5,398,012 A | 3/1995 | Derby et al. | |
| 5,497,368 A | 3/1996 | Reijnierse et al. | |
| 5,687,168 A | 11/1997 | Iwata | |
| 5,754,790 A | 5/1998 | France | |
| 5,815,492 A * | 9/1998 | Berthaud et al. | 370/234 |
| 5,930,259 A | 7/1999 | Katsube | |
| 6,003,090 A | 12/1999 | Puranik et al. | |
| 6,023,501 A | 2/2000 | Wakamatsu | |
| 6,078,590 A | 6/2000 | Farinacci | |
| 6,097,718 A | 8/2000 | Bion | |
| 6,108,710 A | 8/2000 | Brabson | |
| 6,119,170 A | 9/2000 | Schoffelman | |
| 6,205,146 B1 | 3/2001 | Rochberger | |
| 6,222,829 B1 | 4/2001 | Nakazaki | |
| 6,646,989 B1 * | 11/2003 | Khotimsky et al. | 370/238 |

(Continued)

OTHER PUBLICATIONS

U.S. Appl. No. 09/997,420, Guerin.

(Continued)

*Primary Examiner*—Chi Pham
*Assistant Examiner*—Thai Hoang
(74) *Attorney, Agent, or Firm*—Pepper Hamilton LLP

(57) ABSTRACT

A method and system for monitoring traffic and path information in a packet communication network operated according to an IP routing protocol is disclosed. The method and system enables a user, such as a network administrator, to explicitly identify a full set of paths (i.e., links and routers) that the traffic of a specific customer or set of customers, such as service providers hosted at a hosting site, is using when traversing the network. The system allows the dynamic monitoring of the set of active links carrying traffic belonging to the specific customer or set of customers, and the proportion of that traffic that is carried by each active link. This allows, among other things, the identification of network links that are critical for ensuring a high level of service to key customers.

24 Claims, 8 Drawing Sheets

U.S. PATENT DOCUMENTS

| | | | |
|---|---|---|---|
| 6,904,017 B1 * | 6/2005 | Meempat et al. | 370/238 |
| 6,925,061 B2 * | 8/2005 | Lee et al. | 370/238 |
| 2002/0085495 A1 * | 7/2002 | Jeffries et al. | 370/235 |

OTHER PUBLICATIONS

U.S. Appl. No. 10/077,251, Guerin.

U.S. Appl. No. 10/077,245, Guerin.

J.D. Case, et al., "Simple Network Management Protocol", Internet Engineering Task Force, Request for Comments No. 1157, http://www.ietf.org/rfc/rfc1157.txt, May 1990.

Cisco Systems, "NetFlow FlowCollector 3.0 Documentation", http://www.cisco.com/warp/public/732/Tech/netflow/.

Juniper Networks, "Juniper Networks cflowd documentation", http://arachne3.juniper.net/products/network_mgmt_refs.html.

J. Moy, "OSFP Version 2", Internet Engineering Task Force, Request for Comments No. 2328, http://www.ietf.org/rfc/rfc2328.txt, Apr. 1998.

D. Oran, "OSI IS-IS Intra-Domain Routing Protocol", Internet Engineering Task Force, Request for Information No. 1142, http://www.ietf.org/rfc/rfc1142.txt, Feb. 1990.

* cited by examiner

| Active Links List | Path Extension Candidates and Cost | Nodal Traffic | Selected Extension and Link Traffic |
|---|---|---|---|
| - | 110 (1); 111 (0.5) | 90 (1) | 111 (0.5) |
| 111 (*0.5*) | 110 (1); 113 (0.9) | 90 (*1*); 92 (*0.5*) | 114 (0.5) |
| 114 (*0.5*) | 110 (1); 116 (1.6) | 90 (1); 92 (0.5); 95 (0.5) | 110 (0.5) |
| 110 (*0.5*) | 112 (1.5); 113 (1.3); 117 (1.6) | 90 (1); 92 (0.5); 95 (0.5); 91 (0.5) | 113 (0.25) |
| 113 (*0.25*) | 112 (1.5); 116 (1.6); 117 (1.6) | 90 (1); 92 (0.5); 95 (0.5); 91 (0.5); 94 (0.25) | 112 (0.25) |
| 112 (*0.25*) | 115 (1.7); 116 (1.6); 117 (*1.6*) | 90 (1); 92 (0.5); 95 (0.5); 91 (0.5); 94 (0.25); 93 (0.25); | 116 (0.25) |
| 116 (*0.25*) | 115 (1.7); 117 (1.6); 119 (2.0); 120 (1.9) | 90 (1); 92 (0.5); 95 (0.5); 91 (0.5); 94 (0.25); 93 (0.25); 97 (0.25) | 117 (0.5) |
| 117 (*0.5*) | 115 (1.7); 119 (2.0); 120 (1.9) | 90 (1); 92 (0.5); 95 (0.5); 91 (0.5); 94 (0.25); 93 (0.25); 97 (0.25+0.5 = 0.75) | 115 (0.25) |
| 115 (*0.25*) | 118 (2.0); 119 (2.0); 120 (1.9) | 90 (1); 92 (0.5); 95 (0.5); 91 (0.5); 94 (0.25); 93 (0.25); 97 (0.75); 96 (0.25) | 120 (0.375) |
| 120 (*0.375*) | 118 (2.0); 119 (2.0); 122 (2.5) | 90 (1); 92 (0.5); 95 (0.5); 91 (0.5); 94 (0.25); 93 (0.25); 97 (0.75); 96 (0.25); 99 (0.375) | 118 (2.0) |
| 118 (*2.0*) | 119 (2.0); 121 (2.5); 122 (2.5) | 90 (1); 92 (0.5); 95 (0.5); 91 (0.5); 94 (0.25); 93 (0.25); 97 (0.75); 96 (0.25); 99 (0.375); 98 (0.25) | 119 (2.0) |
| 119 (*2.0*) | 121 (2.5); 122 (2.5) | 90 (1); 92 (0.5); 95 (0.5); 91 (0.5); 94 (0.25); 93 (0.25); 97 (0.75); 96 (0.25); 99 (0.375); 98 (0.25+0.375 = 0.625) | 121 (0.625) |
| 121 (*0.625*) | 122 (2.5) | 90 (1); 92 (0.5); 95 (0.5); 91 (0.5); 94 (0.25); 93 (0.25); 97 (0.75); 96 (0.25); 99 (0.375); 98 (0.625); 100 (0.625) | 122 (0.375) |
| 122 (*0.375*) | - | 90 (1); 92 (0.5); 95 (0.5); 91 (0.5); 94 (0.25); 93 (0.25); 97 (0.75); 96 (0.25); 99 (0.375); 98 (0.625); 100 (0.625+0.375 = 1.0) | - |

FIG. 5

| Links | Fraction of Traffic | | Total Traffic |
|---|---|---|---|
| | Path Set 30 | Path Set 31 | |
| 51 | 0.5 | 0.5 | (0.5*T[30])+(0.5*T[31]) |
| 52 | 0.25 | 0.5 | (0.25*T[30])+(0.5*T[31]) |
| 53 | 0.25 | 0.5 | (0.25*T[30])+(0.5*T[31]) |
| 54 | - | 0.5 | 0.5*T[31] |
| 55 | 0.5 | - | 0.5*T[30] |
| 56 | 0.5 | - | 0.5*T[30] |
| 57 | 0.75 | - | 0.75*T[30] |
| 58 | 0.25 | - | 0.25*T[30] |
| 59 | - | 0.5 | 0.5*T[31] |
| 60 | - | 0.5 | 0.5*T[31] |
| 61 | - | 0.5 | 0.5*T[31] |
| 62 | - | 0.5 | 0.5*T[31] |

FIG. 6

METHOD AND SYSTEM FOR TRAFFIC MONITORING IN A PACKET COMMUNICATION NETWORK

FIELD OF THE INVENTION

The present invention relates generally to a method and system for determining the nature, intensity and patterns of traffic flows over a set of links in a packet communication network and preferably an Internet Protocol (IP) routing domain or Autonomous System. In particular, the present invention relates to a method and system for tracking in real time the nature and intensity of traffic that traverses a given set of links and nodes in a communication network, when routing of packets in the communication network is determined according to an IP routing protocol.

BACKGROUND OF THE INVENTION

An Internet protocol (IP) network is a large distributed system in which individual routers automatically adjust their decisions on how to forward packets, or units of data, based on information they learn from their neighboring routers about the state of the network. This design permits rapid recovery in case of link or router failures by allowing affected routers to re-route packets around a failure as soon as they discover it. The Routing Information Protocol (RIP), the Open Shortest Path First (OSPF) or the Intermediate System to Intermediate System (IS-IS) routing protocols are all commonly used embodiments of this design.

However, the distributed mode of operation of such routing protocols makes it difficult for a network administrator to have a global view of the network at any given time, and in particular of which traffic is flowing over which sets of links. Because of this, many network management functions that are available for networks based on more traditional technologies, e.g., connection-oriented technologies such as frame relay or asynchronous transfer mode (ATM), are difficult if not impossible to replicate in IP networks. For example, in a connection-oriented network, the state associated with each connection/user provides the network administrator with a ready handle for tracing its path and monitoring the associated volume of traffic it generates and the resources it consumes in the network, as well as determining the users and services impacted by the failure of network elements. Moreover, the connection-oriented nature of such networks ensures that the impact of failures is containable, inasmuch as connections not traversing the failing elements are not impacted by their failure.

In contrast routing decisions in IP networks are made in a distributed fashion by many routers that are only concerned with local packet forwarding decisions. There is no single entity with complete knowledge of the entire path that a packet will follow at any given time. This makes it difficult for a network administrator to precisely identify the path that the traffic between, for example, two customer sites, is following when traversing the network.

As a consequence, upon identifying a highly congested link, a network administrator has little or no visibility into which customers may be contributing to this congestion and to what extent. Similarly, in the presence of a link failure, identifying how the re-routing of traffic from customers affected by the failure will in turn impact other customers and by how much is again a very complex task.

Management tools do exist for IP networks, but they typically operate at a coarse granularity. In other words, they are not able to isolate the contributions of individual users, or they are limited to local measurements and do not provide an end-to-end or system-wide perspective. For example, routers typically support standard Management Information Bases (MIBs) that can be queried using protocols such as the Simple Network Management Protocol (SNMP). MIBs provide detailed state information about individual routers, e.g., interface status, number of packets or bytes transmitted and received on each interface, etc. However, this information is not only local to each device, but it is also aggregate in that it does not distinguish between the individual users whose traffic is traversing the interface. Conversely, traffic monitoring systems such as Cisco's NetFlow™ or Juniper cflowd™ are capable of capturing detailed, per-user information about the traffic crossing a given interface. However, extending this information to other interfaces in the network is not feasible and requires that traffic monitoring be carried out on every single interface throughout the network. This is typically an impractical task.

A few tools exist that allow end-to-end sampling of paths traversing an IP network. Most of them are based on two core utilities built into the Internet Protocol, ping and traceroute, which allow a network administrator to probe the network in order to generate estimates of end-to-end performance measures. Specifically, ping uses probe packets to record performance measures such as packet loss and delay along a specified path, but does not couple those measurements to internal network information. Similarly, traceroute constructs end-to-end path information, i.e., set of interfaces traversed, between a given starting point and a specified destination address. This path information can then be combined with either MIB or traffic monitoring information to generate path level performance estimates. However, it still does not provide complete visibility into which user traffic is traversing which interfaces. Providing such a capability would require identifying all possible paths through the network, which is not feasible using a solution based on traceroute.

Accordingly, it is desirable to provide an improved method and system for monitoring and tracking the set of interfaces or links through which traffic from specific customers flows as it traverses an IP network.

The following is provided as additional background information about the Internet and Internet routing protocols to help the reader understand the context of the present invention:

The Internet is a global network that consists of multiple interconnected smaller networks or Autonomous Systems (AS) also called routing domains. Packets are units of data that are routed between an origin and a destination on the Internet. The delivery of packets across this Interconnection of Networks is carried out under the responsibility of the IP protocol suite. In particular, routing protocols are responsible for allowing routers to determine how best to forward packets toward their destination.

Internet routing protocols can be divided into intra-domain and inter-domain routing protocols, with inter-domain routing protocols communicating information between ASs, while intra-domain routing protocols are responsible for determining the forwarding of packets within each AS. The RIP, OSPF and IS-IS protocols are examples of intra-domain routing protocols, while the Border Gateway Protocol (BGP) is an example of an inter-domain routing protocol. This general architecture and the associated suite of protocols are rapidly becoming the de facto technology on which modern communication networks are built. This dominance extends from simple local area networks to large-scale, international carrier networks, and is largely due to the robustness and efficiency of networks built using it. In particular, IP networks are often referred to as "connectionless", and the delivery of data packets to their intended destination is performed through a number of "independent" decisions made by the routers to which a packet is being forwarded.

SUMMARY OF THE INVENTION

It is therefore a feature and advantage of the present invention to provide an improved method and system for monitoring and tracking the set of interfaces or links through which traffic from specific customers flows as it traverses an IP network. Another feature and advantage of the present invention is an improved method and system for identifying the set of customer flows traversing a given network link or interface within such an IP network.

In accordance with one embodiment of the present invention, a method of determining traffic intensity comprises the steps of: (1) identifying a set of packets of data that travel across one or more links of a communications network, wherein the set of packets is associated with a group of one or more users of the network; (2) identifying a plurality of network paths across which the packets travel; and (3) determining an intensity of packet traffic corresponding to one or more portions of the network paths, wherein at least a portion of the intensity corresponds to the group of users of the network.

Optionally and preferably, the one or more portions of the network paths are determined by a method comprising the steps of: (1) identifying at least one selected route entry in the communication network, wherein the at least one selected route entry is associated with at least one user in the group of users of the network; and (2) retrieving a path or paths to which the selected route entry relates. This method may also include the step of returning an intensity of traffic for one or more of the network paths. Each path preferably comprises one or more links and one or more routers, and each portion in the subset comprises at least one of the links. This method may be dynamically adjusted as traffic intensities and/or paths change.

Also optionally and preferably, the determining step comprises monitoring traffic at a point that is common to a plurality of the network paths using one or more monitoring parameters. The monitoring parameters may include, for example, an amount of traffic destined for a predetermined destination or set of destinations, an amount of traffic destined to a predetermined user address, and/or an amount of traffic being sent to or received by a user of the network. In this option, the determining step may also include further identifying a set of route entries that are associated with the traffic that is monitored at the point, measuring an amount of the packet traffic for each route entry in the set of route entries, identifying a common set of paths for at least one of the route entries in the set of route entries, and summing the amounts of packet traffic measured for each route entry that shares the common set of paths to yield an intensity of packet traffic for the common set of paths. Further, where each path includes a link, the determining step may also include identifying a set of active links for the network paths, and determining a traffic fraction for each link. The step of determining a traffic intensity for one or more of the active links in the set is preferably done by multiplying the traffic fraction for each said active link by a measurement corresponding to the traffic monitored at the point, wherein the measurement is also associated with the set of paths to which each said active link belongs. Optionally, the method also includes summing, for each said active link, the link traffic intensities obtained for each set of paths to which said active link belongs In accordance with an alternate embodiment of the present invention, a method of measuring traffic intensity in a communications network includes the steps of: (1) identifying a set of packets of data that travel across one or more links of a communications network, wherein the set of packets is associated with one or more users of the network; and (2) determining an intensity of packet traffic corresponding to one or more portions of network paths via which the set of packets travels, wherein at least a portion of the intensity corresponds to the one or more users of the network.

In accordance with yet another embodiment of the invention, a method of measuring traffic intensity in a communications network includes the steps of: (1) identifying a set of packets of data that travel across one or more links of a communications network, wherein the set of packets is associated with one or more users of the network; (2) identifying at least one selected route entry in the communication network, wherein the selected route entry or entries are associated with at least one of the users; (3) retrieving a path or paths to which the selected route entry relates; and (4) determining an intensity of packet traffic corresponding to one or more portions of network paths via which the set of packets travels.

Any or all of the methods described above may be enabled by a computer-readable medium containing instructions thereon for instructing a computer to perform the method, and the invention includes such a medium.

There have thus been outlined the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 also illustrates a possible combination of origins and destinations and the corresponding network paths that may be used when tracking the flow of traffic in accordance with the present invention.

FIG. 5 summarizes the steps taken when traversing the set of paths of FIG. 4 in order to generate the fraction of traffic that each link carries.

FIG. 6 displays the fraction of traffic and total traffic carried by each active link of the example of FIG. 1.

DETAILED DESCRIPTION OF PREFERRED EMBODIMENTS OF THE INVENTION

A preferred embodiment of the present invention provides an improved method and system for monitoring and tracking the flow of customer traffic as it traverses an IP routing domain. The present invention allows a network administrator, network monitoring system, or other human or automated user to monitor the traffic to and/or from a given set of customer sites and track the set of routers and network links through which it is routed when traversing the network. The ability to associate customer traffic with the set of links and routers it uses when traversing the network enables the generation of performance measures, service level agreements, as well as alarms that are specifically targeted at that customer.

Figure 1:
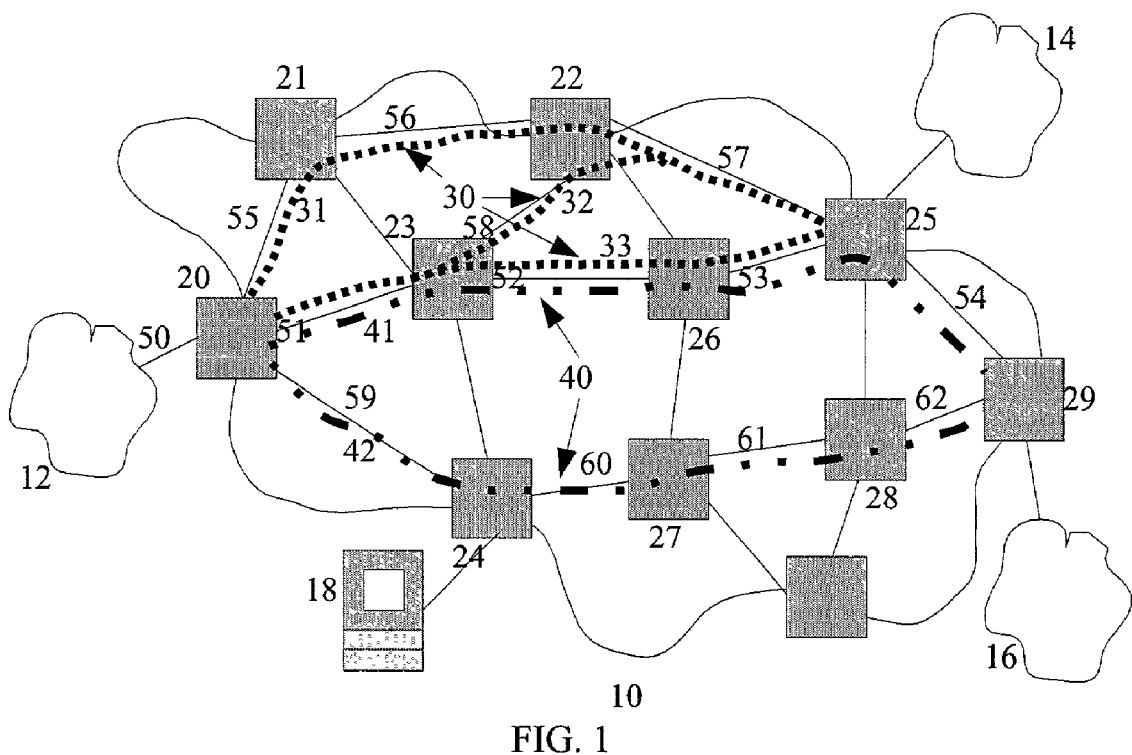
FIG. 1 illustrates an exemplary AS, or routing domain, where the present invention may be applied, including various elements of the AS such as monitoring station, hosting sites, users sites, links and routers.

For example, consider a scenario such as the one illustrated in FIG. 1, where a service provider network 10 is shown together with a hosting site 12 that is offering both hosting services and communication services. Service providers are typically responsible for operating a communication service and the underlying network. The network can be used to access hosting services that optionally may be directly offered by the service provider itself. Hosting services are commonly provided through hosting sites where storage, computing equipment and applications and services are made available to customers. In the context of FIG. 1, the hosting service is located within the hosting site 12, which is connected to the provider's communication network infrastructure 10 at router 20 through access link 50. The provider's network 10 is in turn providing connectivity to various users of the hosting services that are located at hosting site 12. For purposes of illustration, two user sites, 14 and 16, are shown in FIG. 1, but it should be clear that many other configurations are possible. In general, sites are typically associated with access points to the provider's network, and user sites can, for example, be campuses of a company subscribing to one of the services located at the hosting site 12, or they could correspond to the networks of other network service providers whose users are in turn accessing services located at the hosting site 12.

In the context of the scenario of FIG. 1, one of the service provider goals is to deliver the best possible service to the owners of the hosting site (hosting providers), owners of services resident on the hosting site (hosting customers), and users accessing information or applications provided in the hosting site by hosting customers. This service is dependent on the performance of two main components, the servers located at the hosting site 12, and the connectivity offered through the provider's network 10 to users accessing the hosting site. Monitoring servers performance can be readily achieved using a number of existing tools, but providing user or hosting customer specific network performance information is a challenging task in the context of IP networks. Tracking the performance of network paths used to carry traffic from the hosted service to all the users accessing the hosting site is difficult on multiple counts. First, identifying the set of users transmitting to and receiving traffic from the hosting site is in itself complex. There can be a very large number of such users accessing the hosting site at any one time. The set of such users changes rapidly over time. Hence, any method that relies on tracking individual flows, without the ability to determine how to aggregate users associated with the same network path(s), faces a daunting task. Second, tracking the set of paths actually traversed and identifying critical links on those paths, i.e., links carrying a significant fraction of the traffic, calls for both an understanding of how IP routing is performed in the network and for adjusting to changes triggered by various network events, e.g., link or router failures. This is also complex because of the dynamic and distributed nature of IP routing The present invention provides an improved method and system for allowing monitoring of network performance that is specific to customers and users of a provider's network, and in particular for tracking performance measures associated with the path(s) followed by their traffic when traversing a provider's IP network. In the context of this preferred embodiment, this is illustrated for a hosting site with hosting customers and their users, but it should be clear that the same functionality can be provided in many other configurations (e.g., a large Internet service provider providing service for smaller providers, or a large company providing service for or in connection with its suppliers and/or customers). The tracking of traffic can be carried out in real-time or performed off-line when generating performance reports targeted at individual customers. Off-line or historical tracking can be accomplished simply by storing the relevant traffic monitoring data and routing information that is used when performing real-time tracking. Storing of traffic monitoring information simply requires that traffic monitoring reports or summarized information required to generate such reports be kept in permanent storage such as a database. Storage of routing information and path information can be accomplished using a system such as the one described in the co-pending patent application Ser. No. 09/977,470, titled "Path Identification for Packet Networks," filed Nov. 29, 2001, which is incorporated herein by reference in its entirety. For simplicity, we limit our discussion to the case of real-time tracking, but it should be recognized that off-line or historical tracking can be readily performed using similar methods.

In the context of the example illustrated in FIG. 1, a method of tracking performance measures that are of relevance to specific customers includes the steps of identifying user sites 14 and 16 as being traffic sources and sinks for a specific service located at hosting site 12, configuring accordingly the traffic monitoring that needs to be performed on access link 50 connecting hosting site 12 to router 20 in order to estimate the amount of traffic to and from user sites 14 and 16, and then identifying the two sets of network paths 30 and 31 that are used by this traffic to traverse the provider's backbone network 10. The set of paths 30 consists of multiple individual paths 31, 32, and 33, some of which share network links. Path 33 traverses links 51, 52, and 53, path 31 traverses links 55, 56, and 57, while path 32 goes over links 51, 58, and 57, so that link 51 is shared by the paths 32 and 33 and link 57 is shared by the paths 31 and 33. Conversely, the set of paths 40 consist of only two paths that do not share any link. Path 41 uses links 51, 52, 53, and 54, while the path 42 traverses links 59, 60, 61, and 62. Once all the above information is available, e.g, at monitoring station 18, the service provider is then in a position to provide targeted performance information to customers and to proactively monitor network links that are "critical" to them.

For example, assuming that both user sites 14 and 16 are accessing the same service hosted by hosting site 12, the traffic sent back by the application server toward those two user sites traverses the provider's network 10 through the sets of network paths 30 (user site 14) and 40 (user site 16). As a result, the traffic from hosting site 12 to user site 14 typically will be split between the different paths that belong to set of paths 30 while the traffic from user site 16 will be split across the two paths that belong to the set of paths 40. In this example, it can be seen that link 51 carries approximately half of the traffic destined to users located in user site 14, and approximately half of the traffic destined to users located in user site 16. Hence, congestion on this link or network events such as its failure, represent performance measures of significance in the context of the service perceived by users of the application(s) hosted by hosting site 12. As a consequence, it may be desirable to monitor link 51 with increased scrutiny.

Figure 2:
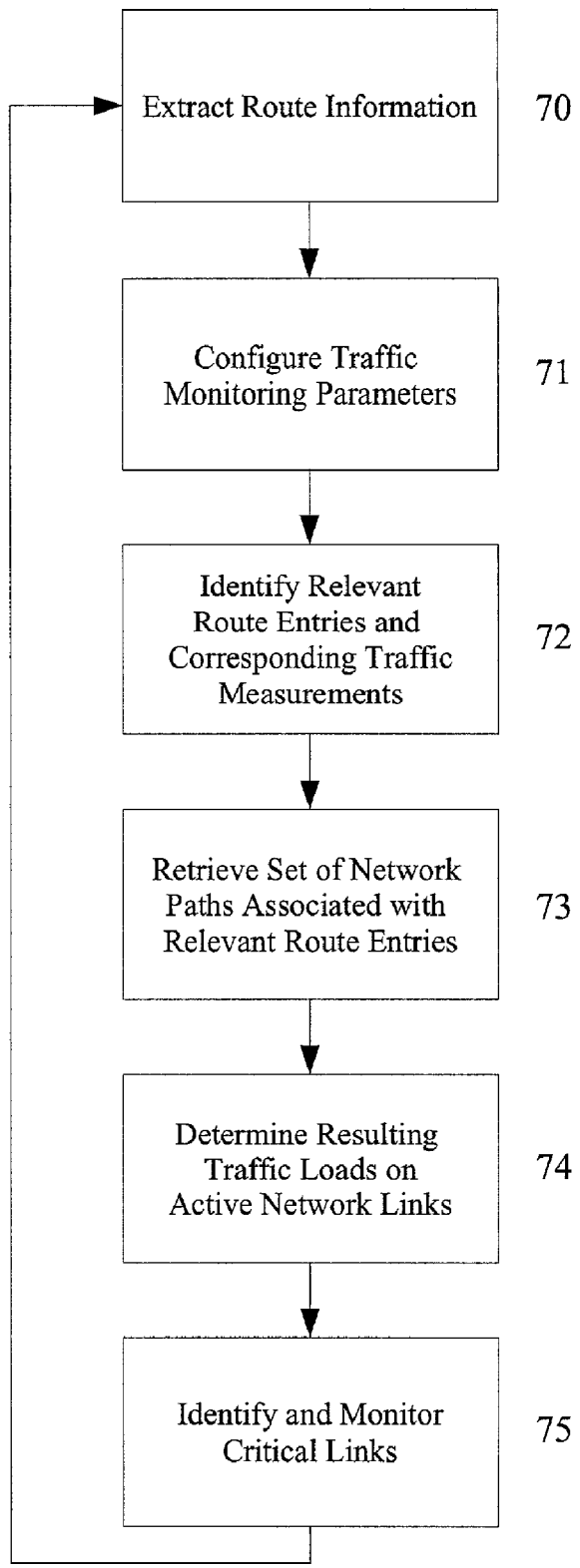
FIG. 2 identifies the major steps involved in tracking the flow of traffic and corresponding set of critical links in accordance with a preferred embodiment of the present invention.

Providing the functionality outlined above for the example of FIG. 1 is accomplished through a number of steps as illustrated in FIG. 2. The first Step 70 consists of retrieving from the provider network (10 in FIG. 1) the set or table of route entries that are currently in use. Those route entries identify the IP address prefixes that are used within the network to forward packets (known as "forwarding prefixes"). As a result, packets that have a destination address that maps to the same route entry will share the same of paths through the networks. The necessary information can be either retrieved directly from one of the routers in network (such as router 20 in FIG. 1), or by relying on a system such as the one disclosed in the co-pending U.S. patent application Ser. No. 09/977,420, titled "Path Identification for Packet Networks," filed Nov. 29, 2001; U.S. patent application Ser. No. 10/077,251, titled "Method and System for Topology Construction and Path Identification in a Routing Domain Operated According to a Simple Link State Routing Protocol," filed Feb. 15, 2002; and U.S. patent application Ser. No. 10/077,245, titled "Method and System for Topology Construction and Path Identification in a Routing Domain Operated According to a Link State Routing Protocol," filed Jan. 28, 2002.

Step 71 is responsible for configuring the traffic monitoring that will typically be performed either at the access router connecting the hosting site to the backbone network, (i.e., router 20 in the case of hosting site 12 of FIG. 1), or by a monitoring device attached to the corresponding access link (50 in FIG. 1). The configuration of monitoring parameters can take multiple forms. It can be based on the set of route entries that have been identified in Step 70, e.g., the access router can monitor the amount of traffic to destinations (or from sources) associated with each route entry. Alternatively, the service provider may specify a number of pre-configured user addresses and monitor traffic to or from those addresses on access link 50, and then optionally determine the set of route entries to which they map. Yet another alternative is to dynamically identify the set of users that are sending or receiving traffic to or from a given service hosted within hosting site 12. This can be achieved by monitoring access link 50 (or access router 20) for packets with destination or source address corresponding to that of the servers assigned to the hosted service in question. Mapping those packets to route entries is then again performed in a subsequent step. In addition and optionally, packet monitoring may be performed by sampling only a representative subset of the packets traversing access link 50 in FIG. 2 (or access router 20 in FIG. 1), and extrapolate actual traffic intensities and distribution on the basis of this sample. The main purpose of Steps 70 and 71 is to provide the ability to associate traffic measurements with network level information, namely, the route entries that are used to forward packets through the network.

It is this association that is used in Steps 72, 73, and 74 to enable customer specific performance monitoring. Step 72 formally associates traffic measurements with existing route entries. In other words, measurements for the amount of traffic destined to or received from specific monitoring entries are then mapped onto corresponding route entries. For example, a user site (such as 16 in FIG. 1) can be associated with several routes or subnets, each with multiple individual users sending or receiving traffic for a hosting site (such as 12 in FIG. 1). Packets sent to or received from those individual users will then be identified by the monitoring performed such as at access link 50 or router 20 of FIG. 1, and would next be mapped onto the corresponding route entries. As mentioned before, this can either be a separate step or combined with the initial configuration of the monitoring parameters.

When performed as a separate step, this involves a lookup into the routing table (i.e., the set of route entries obtained in Step 70) to retrieve the route entry having the most bits in the IP address prefix that correspond to bits in the packet prefix associated with the destination (or source) address of individual users whose packets have been identified by the monitoring performed at access link 50 or router 20. For each match, the traffic intensity, e.g., number of bytes received over a given period of time, for the matching address is added to the cumulative traffic intensity of the associated route entry. More specifically, in a preferred embodiment let $a[i]$, $1 \leq i \leq N$ denote the set of addresses that have been identified by the traffic monitoring system over a period of time, with $t[i]$, $1 \leq i \leq N$ the corresponding traffic intensities. The mapping onto route entries of those addresses and the associated traffic intensities preferably proceeds as follows:

```
For 1 ≤i≤N
{   r = LongestPrefixMatch(a[i]);
    if r not in ActiveRouteList
        { Add r to ActiveRouteList }
    traffic(r) = traffic(r) + t[i]
}
```

Preferably, the three steps identified above are repeated for all the addresses $a[i]$, $1 \leq i \leq N$, that have been identified by the traffic monitoring system over a period of time. In the alternative, the steps may be repeated for a subset of the addresses, such as those that have been identified as being significant sources or destinations. The first step identifies the "longest prefix match" (i.e., the route entry r having the most prefix bits matching those of for address a[i]). Route r is then added to the list of active routes, i.e., routes that are associated with active users, if it was not already in it. Finally, the aggregate traffic t(r) destined for route entry r is incremented by the amount of traffic t[i] associated with address a[i] that was just mapped to route entry r.

Step 73 proceeds next to retrieve the set of paths associated with the active route entries identified in Step 72. For simplicity, we will focus on path associated with traffic flowing from the hosting site to potential users of a service hosted by the hosting site, i.e., replies to queries issued by those users, as this is typically the direction of higher traffic intensity, but it should be recognized that this can be readily extended to handle traffic flowing from users into the hosting site. In the context of the example of FIG. 1, there are multiple paths connecting hosting site 12 to its two active user sites 14 and 16. Path set 30 includes three paths, with each path sharing one link with one of the other paths, namely, one path goes over links 55, 56, and 57, another path goes over links 51, 58, and 57, and the last path goes over links 51, 52, and 53. Path set 40 consists of only two, link-disjoint paths. The first traverses links 51, 52, 53, and 54, while the second goes over links 59, 60, 61, and 62. Active user sites 14 and 16 were identified through the traffic monitoring performed on the access link 50 or at the access router 20, where the destination addresses of packets originating from one or more of the servers hosting services at service site 12 were captured. Those destination addresses identify the users currently accessing the service and were in turn mapped onto corresponding active route entries in Step 72. Those active route entries are then associated with paths through the provider's network 10 in Step 73. The identification of paths and corresponding exit points that are associated with active route entries can be performed in a number of way, but it is preferably done using a system capable of returning the full set of paths that are available to reach a given route entry. One such system is described in the co-pending U.S. patent application Ser. No. 09/977,420, titled "Path Identification for Packet Networks," filed Nov. 29, 2001; U.S. patent application Ser. No. 10/077,251, titled "Method and System for Topology Construction and Path Identification in a Routing Domain Operated According to a Simple Link State Routing Protocol," filed Feb. 15, 2002; and U.S. patent application Ser. No. 10/077,245, titled "Method and System for Topology Construction and Path Identification in a Routing Domain Operated According to a Link State Routing Protocol," filed Jan. 28, 2002.

Figure 3:
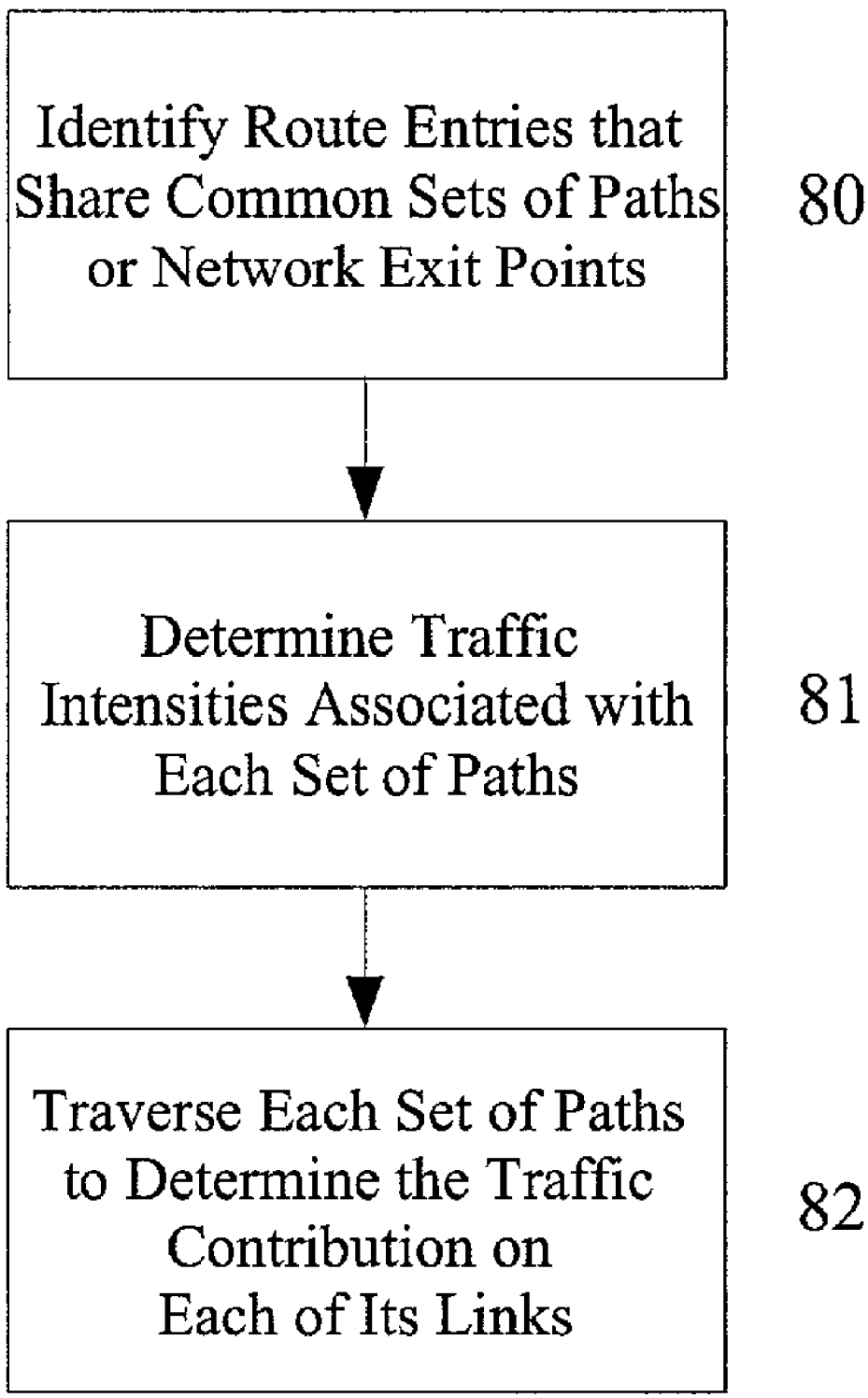
FIG. 3 describes a set of steps used to determine the set of active links and the corresponding amount of traffic they carry when tracking the flow of traffic in accordance with the present invention.

Step 74 is responsible for identifying the amount of traffic associated with users of a given service hosted at a hosting site (such as 12 in FIG. 1) and carried by different network links. A preferred embodiment showing additional detail of this process is carried out as illustrated in FIG. 3. In Step 80 of FIG. 3, route entries that share a common set of paths, i.e., a common exit point from provider network (such as 10 in FIG. 1), are identified. This allows the allocation of route entries to common "traffic bins" that are used to track the total amount of customer traffic that will be flowing through each set of paths. In the context of the example of FIG. 1, all the route entries associated with destination addresses reachable through user site 14 (16) or alternatively exit point 25 or (29) would be identified as sharing the set of paths 30 (31) that are connecting hosting site 12 to destinations reachable through exit point 25 (29). Returning to FIG. 3, once this mapping has been carried out, the total amount of traffic flowing over the associated set of paths is determined in Step 81. This is done simply by adding for each set of paths, the traffic intensities that were computed in Step 72 of FIG. 2 based on traffic measurement information for relevant route entries. In the context of the example of FIG. 1 that has two sets of paths, 30 and 40, traffic intensities would be computed separately for each one of those two sets. For example, assume that routes r[i], where $1 \leq i \leq N$, are associated with a set of paths P originating at a given entry point E. For set of paths 30 (40), the entry point would be router 20 that is connecting the hosting site 12 to routing domain 10, while the routes would correspond to all the route entries associated with user site 14 (16), and advertised in the backbone network 10 by border router 25 (29). As mentioned earlier, those route entries could correspond to subnets located in that user site or to subnets reachable through that user site. The traffic T[P] assigned to the set of paths P would then be computed as the sum of the traffic originating from E and destined to each one of the routes r[i], $1 \leq i \leq N$, are associated with the set of path P, i.e., $T[P]=\Sigma traffic(r[i])$.

Returning again to FIG. 3, once the traffic carried by each set of paths has been identified, the next step, Step 82, is to translate this into link level traffic information. This requires identifying the set of links involved in the different sets of paths, and for each identifying the amount of traffic it carries. The amount of traffic that a link carries is then obtained by adding the traffic contributions from the different sets of paths in which it is involved. Within a given set of paths, the amount of traffic carried by a link is a function of both the total amount of traffic that the set of path carries and of how this traffic is distributed over the different paths in the set. In this preferred embodiment, we assume that traffic arriving at a node, possibly from multiple paths, is split equally between the links used to extend paths out of this node, i.e., if the total amount of traffic entering a node is T and the node has n outgoing links corresponding to different paths, the amount of traffic that each outgoing link carries is T/n. This is consistent with how traffic is split across equal cost path in IP networks. However, note that other splitting ratios can be readily supported by the method described in this embodiment, and our use of an equal splitting is primarily for ease of presentation.

Figure 4:
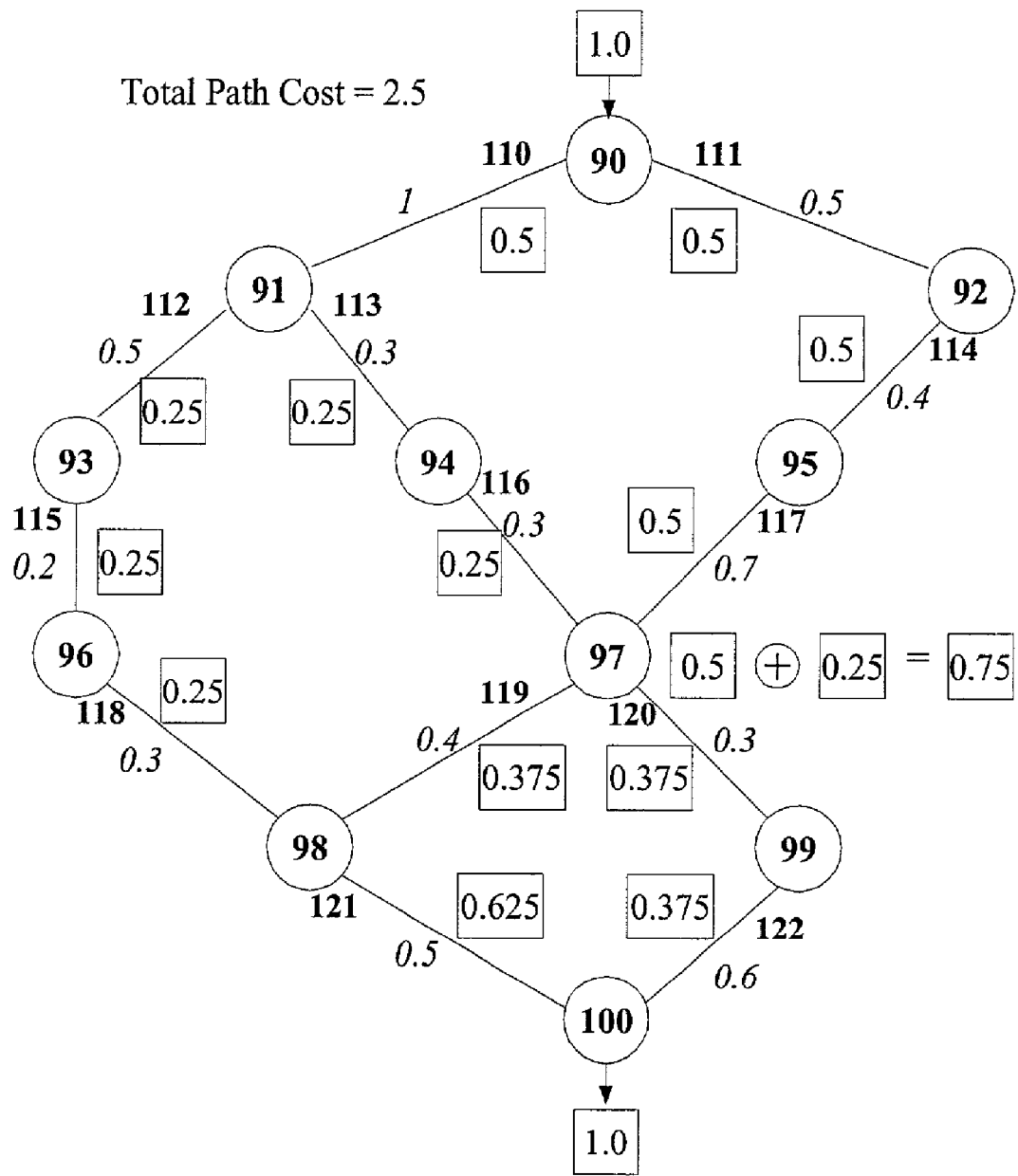
FIG. 4 illustrates a set of paths generated when tracking the flow of traffic in accordance with the present invention and displaying both the associated link costs and the fraction or the traffic assigned to the set of paths that each link carries.

The preferred method used to determine the amount of traffic carried by a link belonging to a given set of paths is illustrated in FIG. 4 and FIG. 5. FIG. 4 displays a set of paths connecting a starting node 90 in a routing domain to a destination node 100 in the routing domain through nodes 91 to 99. In FIG. 4, nodes are identified as circles (with reference numbers in bold type) and communication links between each node are identified as lines (also with reference numbers in bold text). The decimal number shown in italicized font next to each link represents the cost that is used by the routing protocol in computing paths through the routing domain. Additionally, the number shown inside a square box next to each link represents the fraction of traffic it carries, with one unit representing the total traffic that is entering at node 90. When there is more than one possible link by which traffic may exit a node, the traffic is divided equally between or among the links. For example, link 110 that connects node 90 to node 91, has been assigned a cost of one (1) and carries half (0.5) of the traffic exiting node 90. The fraction of the original traffic entering the source node 90 that is carried by a given link is computed by extending paths one link at the time, starting from the source node 90, based on which one corresponds to a minimum cost path extension. As links are selected by the path extension procedure, they are added to the set of "active links," i.e., links that carry traffic within the given set of paths, and the fraction of traffic that will be carried by the link is computed based on the total fraction of traffic entering the node out of which the link extends and the number of links from that node that belong to paths from the set of paths. The operation of this procedure is best explained by going through the example of FIG. 4 and by referring to the summary of FIG. 5.

From FIG. 4 we see that there are two possible path extensions out of node 90, namely, links 110 and 111, which will therefore each carry half of the traffic entering node 90, i.e., 0.5 units of traffic, since the traffic exiting node 90 is equally split between the two outgoing links. Link 111 has a cost of 0.5, which is lower than the cost of 1 for link 110. As a result, the path extension selects link 111. The link is added to the set of active links. The second step of the path extension considers link 110 as well as link 122 that is exiting node 92, which was reached from node 90 through link 111. Link 113 has a cost of 0.4, which when added to the current "path cost" of 0.5 for reaching node 92, gives a total path cost of 0.9. This total cost is the lowest among all possible path extensions (the only other alternative is the path extension using link 110, which has a cost of 1). As a result, the second path extension proceeds with link 113 that is then also added to the list of active links. Because link 113 is the only link exiting node 92, it will carry all the traffic exiting that node, and therefore carries a fraction of traffic equal to 0.5 (the total fraction entering node 92). The third path extension step has a choice between a path of cost 1 when using link 110 to extend the path from node 90 to node 91, and a path of cost 1.6 when using link 116 to extend the path from node 95 to 97. Because the first choice has a lower cost, link 110 is selected and added to the list of active links. The fraction of traffic it carries is equal to 0.5, i.e., half the traffic entering node 90. The fourth path extension step has now three choices: the path of cost 1.6 when using link 116 to extend the path from node 95 to 97, and two path extensions out of node 91, namely using link 112 (cost 0.5) or link 113 (cost 0.3). The path extension using link 112 results in a path of total cost 1.5, while the path extension using link 113 yields a path of total cost 1.3. As a result, link 113 is selected and the path is extended to node 94. The fraction of traffic carried by link 113 is equal to 0.25, i.e., half the amount of traffic entering node 91. Subsequent path extension steps proceed in a similar manner, and FIG. 5 provides a complete description of all the path extensions steps taken until all paths have been traversed. The figure also displays the fraction of traffic entering each node involved in paths belonging to the set of paths.

Returning to Step 82 of FIG. 3 and to the example of FIG. 1, Step 82 involves determining the set of active links and the fraction of traffic they carry for the two sets of paths 30 and 31, which are used for sending traffic to users of the service hosted by hosting site 12. For each set of paths, the set of active links and the fraction of traffic they carry is shown in FIG. 6. The last column of FIG. 6 also shows the total amount of traffic associated with the service hosted by hosting site 12 that each link carries, where T[30] corresponds to the traffic carried by the set of paths 30 and T[31] corresponds to the traffic carried by the set of paths 31. Once the traffic carried by each link is known, it is then possible to assess in Step 75 of FIG. 2, which links are "critical" in ensuring good performance to users of services hosted by hosting site 12. For example, as mentioned earlier, link 51 can be seen to carry half the traffic destined to both users in user's site 14 and user's site 16, and therefore identified as a critical link for the service. It should be noted that as shown in FIG. 1, the overall process that has just been described is typically not a static process. The set of routes used in the network, the paths that are associated with each route, the number and location of users accessing services as well as the amount of traffic generated by those services will vary over time. As a result and as illustrated through the feedback arrow connecting Steps 74 and 70 in FIG. 1, the tracking of active links and users associated with a given service is usually a dynamic process, where the various parameters identified in FIG. 1 are continuously monitored over time.

In this preferred embodiment, two important sets of parameters that are monitored for changes include the set of routes in use in the network and the traffic information associated with routes (bins) whose traffic intensities are being monitored. The system continuously tracks these two sets and regularly, such as periodically or upon detecting a change, refreshes the state of the system responsible for monitoring active links and the traffic they carry. This refreshing of state can involve reconfiguring traffic monitoring parameters (Step 71 of FIG. 2) based on changes in route information (Step 70 of FIG. 2), or changing the mapping of traffic information onto route entries (Step 72 of FIG. 2) again based on changes in route information (Step 70 of FIG. 2). In the context of the example of FIG. 1, identifying changes in the set of routes and in the traffic monitoring information can be carried out directly at router 20. Alternatively, monitoring station 18 may configure the traffic monitoring carried out at router 20 based on route information it extracts from the network. In such a case, monitoring station 18 would only communicate to router 20 changes in the set of routes and how they affect traffic monitoring parameters. In either case, router 20 would preferably communicate back to monitoring station 18 the set of relevant routes it has identified together with the associated traffic loads (Step 72 of FIG. 2). Alternatively, most of that responsibility could be deferred to monitoring station 18, by having router 20 communicate raw traffic monitoring information to monitoring station 18, which would then be responsible for combining it with routing information in order to identify relevant route entries and their associated traffic loads (Step 72 of FIG. 2).

Certain portions of the invention may be performed by an automated processing system. Viewed externally in FIG. 7, an exemplary computer system designated by reference numeral 101 has a central processing unit located within a housing 108 and disk drives 103 and 104. Disk drives 103 and 104 are merely symbolic of a number of disk drives which might be accommodated by the computer system. Typically these would include a hard disk drive and optionally one or more floppy disk drives such as 103 and/or one or more CD-ROMs, CD-Rs, CD-RWs or digital video disk (DVD) devices indicated by slot 104. The number and types of drives typically varies with different computer configurations. Disk drives 103 and 104 are in fact options, and they may be omitted from the computer system used in connection with the processes described herein. An exemplary storage medium 110, which is one type of carrier that may contain program instructions and/or data, is also illustrated. Additionally, the computer system utilized for implementing the present invention may be a stand-alone computer having communications capability, a computer connected to a network or able to communicate via a network, a handheld computing device, or any other form of computing device capable of carrying out equivalent operations.

The computer also has or is connected to or delivers signals to a display 105 upon which graphical, video and/or alphanumeric information is displayed. The display may be any device capable of presenting visual images, such as a television screen, a computer monitor, a projection device, a handheld or other microelectronic device having video display capabilities, or even a device such as a headset or helmet worn by the user to present visual images to the user's eyes. The computer may also have or be connected to other means of obtaining signals to be processed. Such means of obtaining these signals may include any device capable of receiving images and image streams, such as video input and graphics cards, digital signal processing units, appropriately configured network connections, or any other microelectronic device having such input capabilities.

An optional keyboard 106 and a directing device 107 such as a remote control, mouse, joystick, touch pad, track ball, steering wheel, remote control or any other type of pointing or directing device may be provided as input devices to interface with the central processing unit.

Figure 7:
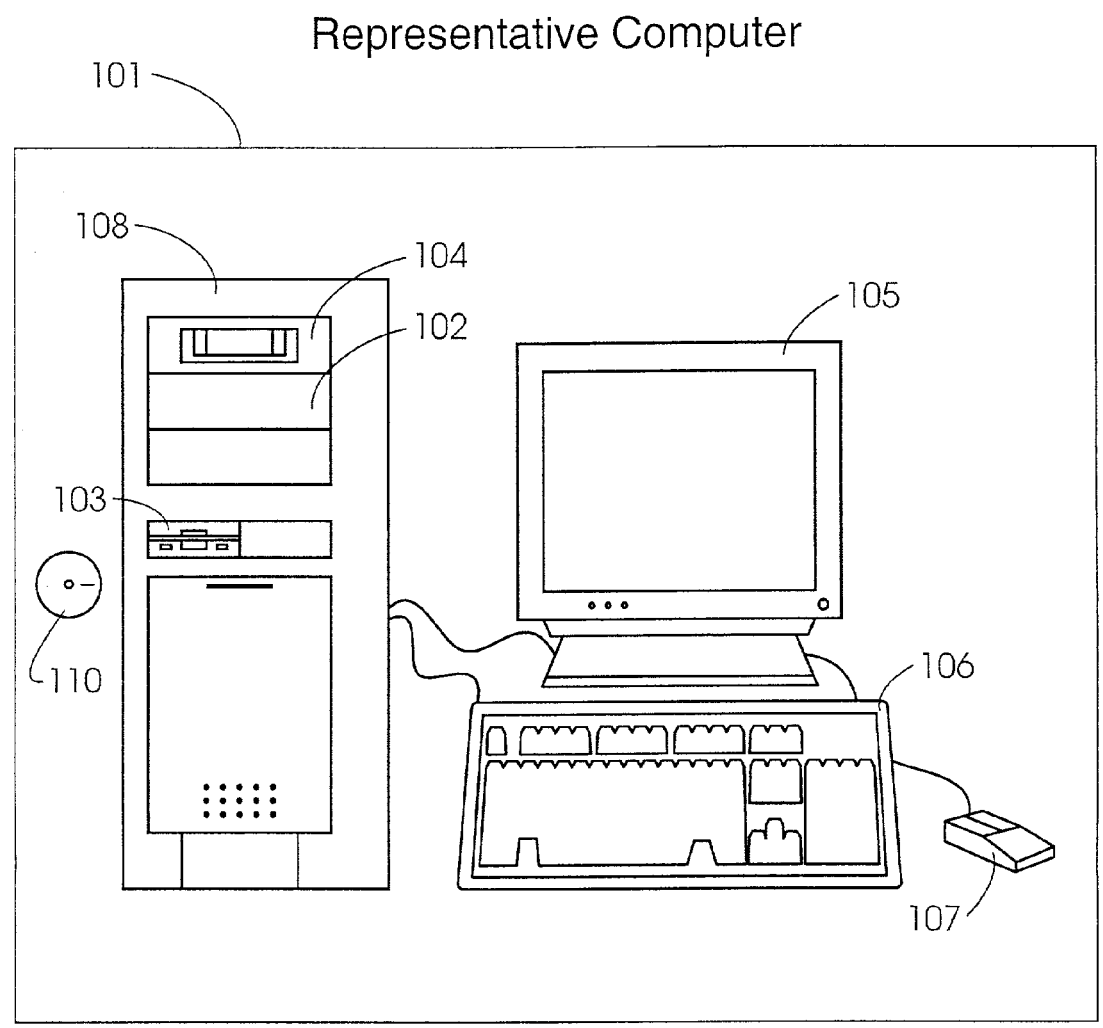
FIG. 7 illustrates an exemplary computing device and carrier.
Figure 8:
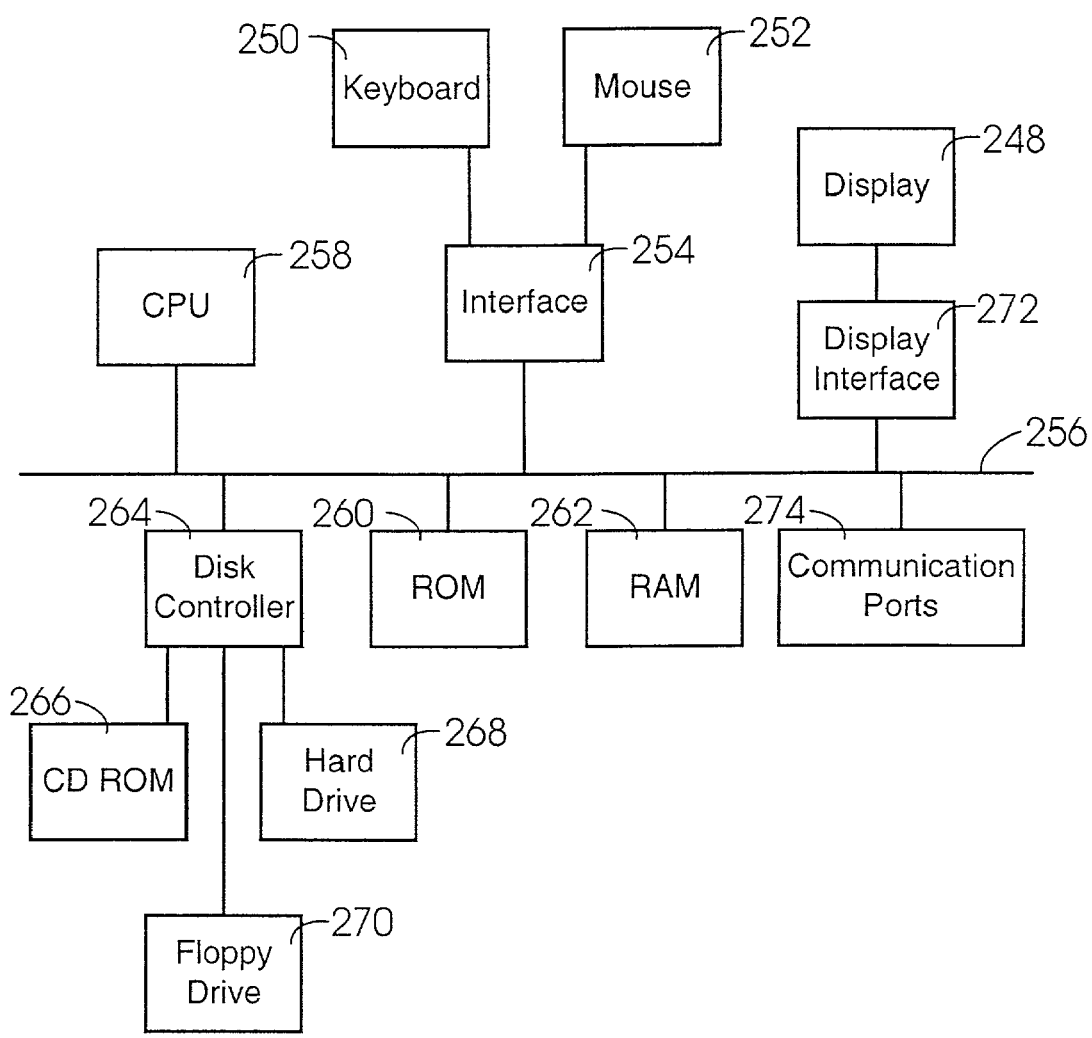
FIG. 8 illustrates a block diagram of the internal hardware of the computer of FIG. 7.

FIG. 8 illustrates a block diagram of the internal hardware of the computer of FIG. 7. A bus 256 serves as the main information highway interconnecting the other components of the computer. CPU 258 is the central processing unit of the system, performing calculations and logic operations required to execute a program. Read only memory (ROM) 260 and random access memory (RAM) 262 constitute the main memory of the computer.

A disk controller 264 interfaces one or more disk drives to the system bus 256. These disk drives may be external or internal floppy disk drives such as 270, external or internal CD-ROM, CD-R, CD-RW or DVD drives such as 266, or external or internal hard drives 268 or other many devices. As indicated previously, these various disk drives and disk controllers are optional devices.

Program instructions may be stored in the ROM 260 and/or the RAM 262. Optionally, program instructions may be stored on a computer readable carrier such as a floppy disk or a digital disk or other recording medium, flash memory, a communications signal, and/or a carrier wave.

A display interface 272 permits information from the bus 256 to be displayed on the display 248 in audio, graphic or alphanumeric format. Communication with external devices may optionally occur using various communication ports such as 274.

In addition to the standard components of the computer, the computer also includes an interface 254 which allows for data input through the keyboard 250 or other input device and/or the directional or pointing device 252 such as a remote control, pointer, mouse or joystick.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

What is claimed is:

1. A method of determining traffic intensity associated with one or more users of a communications network, comprising:

identifying a set of packets of data that travel across one or more links of a communications network, wherein the set of packets is associated with a group of users of the network, the group comprising one or more users;

identifying a plurality of network paths across which the packets travel;

determining an intensity of packet traffic corresponding to one or more portions of the network paths, wherein at least a portion of the intensity corresponds to the group of users of the network, wherein each of the portions of the network paths comprises a link, and wherein the determining step comprises:

monitoring traffic at a point that is common to a plurality of the network paths using one or more monitoring parameters, determining a traffic fraction for each link of at least one network path, and determining a traffic intensity for one or more of the links of the at least one network path by multiplying the traffic fraction for each link by a measurement corresponding to the traffic monitored at the point, wherein the measurement is also associated with the set of network paths to which each link belongs; and providing the intensity of packet traffic to a network traffic monitor to generate one or more of a performance measure, a metering amount, a metering projection, a service level agreement, an alarm trigger and an alarm.

2. The method of claim 1 wherein one or more portions of the network paths are determined by a method comprising the steps of identifying at least one selected route entry in the communication network, wherein the at least one selected route entry is associated with at least one user in the group of users of the network; and retrieving a path or paths to which the selected route entry relates.

3. The method of claim 2, further comprising the step of returning an intensity of traffic for one or more of the network paths.

4. The method of claim 1, wherein each path comprises one or more links and one or more routers.

5. The method of claim 1 wherein the monitoring parameters comprise an amount of traffic destined for a predetermined destination or set of destinations, an amount of traffic destined to a predetermined user address, and/or an amount of traffic being sent to or received by a user of the network.

6. The method of claim 1 wherein the determining step further comprises:

identifying a set of route entries that are associated with the traffic that is monitored at the point;

measuring an amount of the packet traffic for each route entry in the set of route entries;

identifying a common set of paths for at least one of the route entries in the set of route entries; and summing the amounts of packet traffic measured for each route entry that shares the common set of paths to yield an intensity of packet traffic for the common set of paths.

7. The method of claim 1 further comprising summing, for each said active link, the link traffic intensities obtained for each set of paths to which said active link belongs.

8. The method of claim 1 wherein the method is dynamically adjusted as paths and/or traffic intensity changes.

9. The method of claim 1 wherein performing an operation comprises reconfiguring a network path traversed by packets corresponding to one or more route entries.

10. The method of claim 1 wherein providing the intensity of packet traffic comprises billing the group of users based on the intensity of packet traffic.

11. A method of measuring traffic intensity in a communications network, comprising:

identifying a set of packets of data that travel across one or more links of a communications network, wherein the set of packets is associated with one or more users of the network;

determining an intensity of packet traffic corresponding to one or more portions of network paths via which the set of packets travels, wherein at least a portion of the intensity corresponds to the one or more users of the network, wherein each of the portions of the network paths comprises a link, and wherein the determining step comprises:
  monitoring traffic at a point that is common to a plurality of the network paths using one or more monitoring parameters,
  determining a traffic fraction for each link of at least one network path, and
  determining a traffic intensity for one or more of the links of the at least one network path by multiplying the traffic fraction for each link by a measurement corresponding to the traffic monitored at the point, wherein the measurement is also associated with the set of network paths to which each link belongs; and
  providing the intensity of packet traffic to a network traffic monitor to generate one or more of a performance measure, a metering amount, a metering projection, a service level agreement, an alarm trigger and an alarm.

12. The method of claim 11 wherein the method is dynamically adjusted as paths and/or traffic intensity changes.

13. The method of claim 11 wherein providing the intensity of packet traffic comprises reconfiguring the network paths traversed by one or more route entries.

14. The method of claim 11 wherein providing the intensity of packet traffic comprises billing the one or more users based on the intensity of packet traffic.

15. A method of measuring traffic intensity in a communications network, comprising:
  identifying a set of packets of data that travel across one or more links of a communications network, wherein the set of packets is associated with one or more users of the network;
  identifying at least one selected route entry in the communication network, wherein the at least one selected route entry is associated with at least one of the users;
  retrieving a path or paths to which the selected route entry relates;
  determining an intensity of packet traffic corresponding to one or more portions of network paths via which the set of packets travels, wherein each of the portions of the network paths comprises a link, and wherein the determining step comprises:
    monitoring traffic at a point that is common to a plurality of the network paths using one or more monitoring parameters,
    determining a traffic fraction for each link of at least one network path, and
    determining a traffic intensity for one or more of the links of the at least one network path by multiplying the traffic fraction for each link by a measurement corresponding to the traffic monitored at the point, wherein the measurement is also associated with the set of network paths to which each link belongs; and
    providing the intensity of packet traffic to a network traffic monitor to generate one or more of a performance measure, a metering amount, a metering projection, a service level agreement, an alarm trigger and an alarm.

16. The method of claim 15 further comprising the step of returning an intensity of traffic for one or more of network paths that correspond to one or more users of the network.

17. The method of claim 15 wherein the method is dynamically adjusted as paths and for traffic intensity changes.

18. The method of claim 15 wherein providing the intensity of packet traffic comprises reconfiguring the network paths traversed by one or more route entries.

19. The method of claim 15 wherein providing the intensity of packet traffic comprises billing the one or more users based on the intensity of packet traffic.

20. A computer-readable medium encoded with computer executable instructions thereon for instructing a computing device to measure traffic intensity in a communications network by a method, comprising:
  identifying a set of packets of data that travel across one or more links of a communications network, wherein the set of packets is associated with a group of users of the network, the group comprising one or more users;
  identifying a plurality of network paths across which the packets travel;
  determining an intensity of packet traffic corresponding to one or more portions of the network paths, wherein at least a portion of the intensity corresponds to the group of users of the network, wherein each of the portions of the network paths comprises a link, and wherein the determining step comprises:
    monitoring traffic at a point that is common to a plurality of the network paths using one or more monitoring parameters,
    determining a traffic fraction for each link of at least one network path, and
    determining a traffic intensity for one or more of the links of the at least one network path by multiplying the traffic fraction for each link by a measurement corresponding to the traffic monitored at the point, wherein the measurement is also associated with the set of network paths to which each link belongs; and
    providing the intensity of packet traffic to a network traffic monitor to generate one or more of a performance measure, a metering amount, a metering projection, a service level agreement, an alarm trigger and an alarm.

21. A method of measuring traffic intensity in a communications network, comprising:
  identifying a set of packets of data that travel across one or more links of a communications network, wherein the set of packets is associated with one or more route entries;
  identifying a plurality of network paths across which the packets travel; and
  determining an intensity of packet traffic corresponding to one or more portions of the network paths, wherein at least a portion of the intensity corresponds to the one or more route entries, wherein the determining step comprises:
    monitoring traffic at a point that is common to a plurality of the network paths using one or more monitoring parameters,
    identifying a set of route entries that are associated with the traffic that is monitored at the point,
    measuring an amount of the packet traffic for each route entry in the set of route entries,
    identifying a common set of paths for at least one of the route entries in the set of route entries, and summing the amounts of packet traffic measured for each route entry that shares the common set of paths to yield an intensity of packet traffic for the common set of paths; and providing the intensity of packet traffic to a network traffic monitor to generate one or more of a performance measure, a metering amount, a metering projection, a service level agreement, an alarm trigger and an alarm.

22. The method of claim 21 wherein providing the intensity of packet traffic comprises reconfiguring the network paths traversed by the one or more route entries.

23. The method of claim 21 wherein providing the intensity of packet traffic comprises billing at least one user associated with the one or more route entries based on the intensity of packet traffic.

24. A computer-readable medium encoded with computer executable instructions thereon for instructing a computing device to measure traffic intensity in a communications network by a method, comprising:

identifying a set of packets of data that travel across one or more links of a communications network, wherein the set of packets is associated with one or more route entries;

identifying a plurality of network paths across which the packets travel; and determining an intensity of packet traffic corresponding to one or more portions of the network paths, wherein at least a portion of the intensity corresponds to the one or more route entries, wherein the determining step comprises:

monitoring traffic at a point that is common to a plurality of the network paths using one or more monitoring parameters, identifying a set of route entries that are associated with the traffic that is monitored at the point, measuring an amount of the packet traffic for each route entry in the set of route entries, identifying a common set of paths for at least one of the route entries in the set of route entries, and summing the amounts of packet traffic measured for each route entry that shares the common set of paths to yield an intensity of packet traffic for the common set of paths; and providing the intensity of packet traffic to a network traffic monitor to generate one or more of a performance measure, a metering amount, a metering projection, a service level agreement, an alarm trigger and an alarm.

* * * * *